United States Patent [19]

Becerra-Novoa et al.

[11] Patent Number: 5,078,787
[45] Date of Patent: Jan. 7, 1992

[54] METHOD AND APPARATUS FOR THE PRODUCTION OF HOT DIRECT REDUCED IRON

[75] Inventors: Jorge O. Becerra-Novoa, Apodaca; Fernando R. Webb-Balderas, San Nicolás de los Garza; Federico E. Carranza-Almaguer, Monterrey, all of Mexico

[73] Assignee: Hylsa S.A. de C.V., Monterrey, Mexico

[21] Appl. No.: 531,930

[22] Filed: Jun. 1, 1990

[51] Int. Cl.$^5$ .............................................. C21B 11/00
[52] U.S. Cl. ................................................ 75/443
[58] Field of Search ........................................ 75/443

[56] References Cited

U.S. PATENT DOCUMENTS

| | | | |
|---|---|---|---|
| 2,784,077 | 3/1957 | Greenawalt | 75/443 |
| 2,784,079 | 3/1957 | Greenawalt | 75/443 |
| 2,846,301 | 8/1958 | Greenawalt | 75/443 |
| 2,846,302 | 8/1958 | Greenawalt | 75/443 |
| 2,876,092 | 3/1959 | Greenawalt | 75/443 |
| 2,876,093 | 3/1959 | Greenawalt | 75/443 |

Primary Examiner—Peter D. Rosenberg
Attorney, Agent, or Firm—A. Thomas S. Safford

[57] ABSTRACT

A method and apparatus for the gaseous reduction of particulate iron ores, wherein the ore or is fed to a vertical moving bed direct reduction reactor, reduced therein, and discharged as hot sponge iron. The ore is charged to the top portion of the reduction zone of the furnace wherein the bed of particles which descend by gravity is reduced by a hot reducing gas largely composed by carbon monoxide and hydrogen. The hot reducing gas is divided in two portions, a first portion which flows upwardly through the reduction zone to reduce the ores therein, and a second portion which flows downwardly through a lower discharge zone to maintain the bed at a suitable temperature level. Finally, the product sponge iron is discharged from the bottom portion of the discharge zone of the furnace and conveyed, for example, to be melted in an electric arc furnace or to be briquetted in a briquetting machine coupled to the reduction reactor.

8 Claims, 1 Drawing Sheet

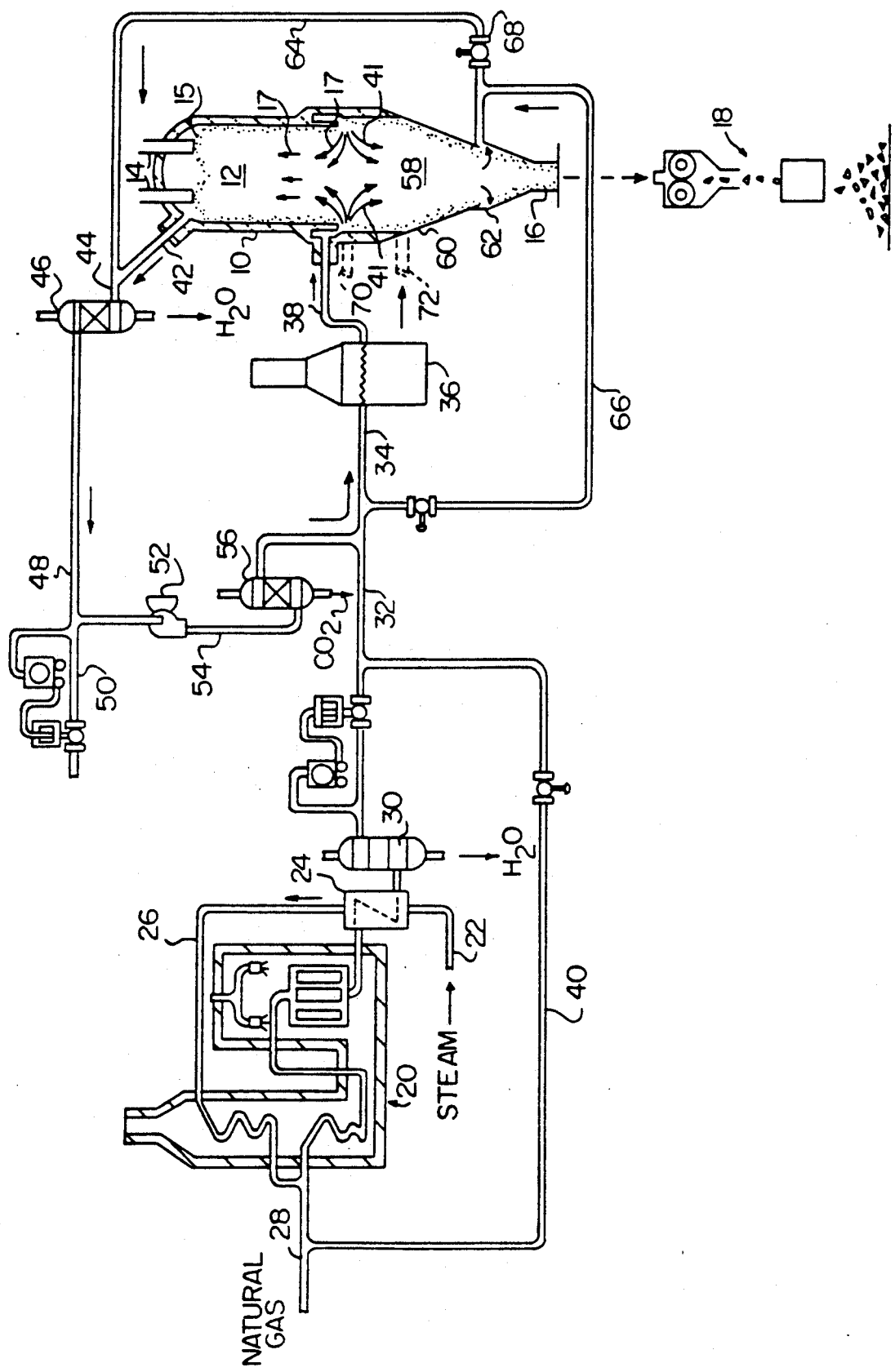

METHOD AND APPARATUS FOR THE PRODUCTION OF HOT DIRECT REDUCED IRON

FIELD OF THE INVENTION

This invention relates to a method and apparatus for the gaseous reduction of iron ores in moving bed vertical reduction reactors to directly reduce the ores into sponge iron product which product is hot discharged and which invention is particularly useful for briquetting, for direct introduction of the still-hot product into electric arc furnaces, or the like.

BACKGROUND OF THE INVENTION

Typically the production of sponge metal in moving bed vertical reduction reactors involves the reduction of pebble-sized particles or lumps of metal oxides, ores or the like which descend downwardly through a reduction zone counter to a suitable upwardly flowing stream of hot reducing gas, largely composed of carbon monoxide and hydrogen at temperatures on the order of 850° C. to 1100° C. and for iron oxide preferably 900° C. to 1000°, and modifying or carburizing the reduced metal oxides in a lower zone of the reduction reactor and discharging and conveying the hot metallized product without further modification directly to electric arc furnaces or the like by means of any appropriate conveying means, or hot briquetting the discharged product by means of a briquetting machine directly coupled to the reduction reactor.

Sponge iron produced in an apparatus and by a process of this type is disclosed in Beggs et al. U.S. Pat. No. 4,188,022 and Beggs et al. divisional U.S. Pat. No. 4,251,267 wherein iron oxide pellets or other particulate iron ore feed are charged to a vertical shaft furnace having an upper portion defining a reduction zone wherein a moving burden of particles is formed, and through which a hot reducing gas flows upwardly in countercurrent relationship to the movement of the burden, and a bottom portion extending into a hopper, which latter forms a gas disengaging plenum through which a co-current downwardly flowing sealing hot inert gas is disengaged from the descending pellets. Since the seal gas pressure is sufficient to prevent downflow of reducing gas leakage into the lower portion of the furnace, the amount of reducing gas leakage is kept to a minimum. Thus the gas leakage from the furnace through the furnace discharge pipe is principally recirculated seal gas containing only small amounts of CO and $H_2$ reducing gas. The seal gas is preferably a gas having a high nitrogen content, such as the product of combustion containing no free oxygen.

The principal problem to which that patent is directed is to prevent leakage to the atmosphere of highly combustible and toxic furnace gas from the furnace discharge outlet. The patent teaches that the mere use of valves or locks have been tried without success in hot discharge direct reduction furnaces, because of their tendency to become bound or stuck because of the softness and stickiness of the hot reduced iron product which usually causes such valves to leak. Although a hot briquetting machine is coupled to the furnace discharge, it is isolated from the highly flammable gases maintained at relatively high pressure in the reduction furnace by means of the inert seal gas system at the lower end of the furnace, which is intended to insure that the gases present at the furnace discharge are non-flammable despite the character of the gases present within the reduction furnace.

That patent relies on the use of a hot inert gas which has to be circulated downwardly through the burden to avoid the leakage of the reducing gases. Such method and apparatus has the disadvantage that the capital investment is increased because of the ancillary equipment needed to maintain a flow of hot inert gas.

See also U.S. Pat. Nos. 4,734,128 and 4,834,792 for two other references showing hot discharge of sponge iron from a moving bed direct reduction reactor (with addition of natural gas to either the discharge zone or to the reducing zone, for control of carburization). No co-current flows are taught relative to the descending moving bed.

Sanzenbacher in U.S. Pat. No. 4,536,213 teaches use of natural gas and/or process gas containing significant amounts of higher hydrocarbons as a source for the reducing gas in a similar process and apparatus for the production of sponge iron in a moving bed Vertical reduction reactor. The natural/process gas is exposed first to the hot descending burden, which acts as a catalyst to crack the higher hydrocarbons, prior to separating, cleaning, and passing such gas through the reformer. In the first illustrated embodiment, the gas moves through the reactor only upwardly in the reducing zone countercurrent to the descending hot burden. In the second illustrated embodiment, the natural/process gas flows downwardly in a co-current direction with the descending burden in an intermediate portion of the reactor, below the reducing zone. There is no disclosure that the natural/process gas is heated. Furthermore that gas is withdrawn and the burden is subsequently cooled by an upflow countercurrent of cooling gas to discharge the burden cold. The present invention avoids this cooling effect.

Hiseh in U.S. Pat. No. 4,160,663 and U.S. Pat. No. 4,212,452 discloses a method and apparatus for the solid fuel direct reduction of iron ore carried out in a moving bed vertical shaft furnace to which ore and a solid fuel (which may be coal, charcoal, or any cellulosic material) are fed. While this does show some co-current flow of hot gases, it does so without controlled hot discharge.

The shaft furnace has three zones, (A) a gasification and initial reduction zone at the uppermost portion, (B) a second or final reduction zone, and (C) a third cooling and carburizing zone. In the initial reduction zone (A), the fuel is gasified by a controlled introduction of oxygen, steam and regenerated top gas and the conditions are controlled to produce CO and $H_2$ diluted with $CO_2$ and steam, while preheating and initiating reduction of the iron ore. The ore, fuel, and gases descend co-currently into a second or final reduction zone (B), wherein hot hydrogen-enriched reducing gases are introduced in the middle of the (B) zone. Off gases are removed from the upper portion and from the bottom of the second zone (B), cooled, purified of dust and carbon dioxide and, if necessary, of sulfur. A portion of the purified gases is mixed with air and burned to produce hot steam and power and to extract oxygen from air. The remaining purified gases are divided into two portions, one portion is enriched with $H_2$ and together with hot steam is introduced into the middle of the second zone (B). This flows both upwardly (countercurrent) and downwardly (co-current) through the descending burden. The other portion of the remaining purified gases is cooled and dehumidified and introduced into the third zone (C) near the bottom of the furnace above and below a grate for cooling and carburizing. The sponge iron from the second zone enters the third cooling and carburizing zone (C), where it descends counter-currently to the rising dehumidified gases which cool and carburize the sponge iron. Finally the sponge iron is discharged cold.

Celada et al in U.S. Pat. No. 3,816,102 shows a split flow of hot reducing gas in the reduction zone of a moving bed vertical shaft furnace for the production of sponge iron (where there is the usual counter-current flow in the upper part of the reducing zone and a co-current descending flow of reducing gas relative to the descending burden of ore in the lower portion of the reducing zone). However, this patent disclosed a cooling zone and teaches cold discharge of the burden.

Price-Falcon et al in U.S. Pat. No. 4,793,856 (the contents of which are incorporated herein by reference) teach a process for the production of sponge iron where the usual upward counter-current flow of hot reducing gas in the reduction zone of a moving bed vertical shaft reactor is supplemented by a downward co-current flow of cooling gas along the walls of the reactor (to reduce the tendency of the burden to agglomerate and stick to the walls, thus permitting the reduction reaction to proceed at a higher than normal overall temperature thus resulting in more efficient operation). However, the counter-current flow is not only a cooling flow, but the reactor has a cooling zone, and cold discharge of the burden is taught.

It is accordingly an object of the present invention to provide method and apparatus for the gaseous reduction of iron ore in moving bed vertical reduction reactors into a highly metallized sponge iron product which is hot discharged at an average bulk temperature maintained at a level suitable for immediate melting or hot briquetting by suitable prevention and/or compensation for heat loss during the passage of the bed along the discharge zone of the shaft furnace.

Other objects and advantages of the invention will in part become obvious and in part be particularly pointed out hereafter.

SUMMARY OF THE INVENTION

The present invention provides a method and apparatus for the gaseous reduction of iron ores in moving bed vertical reduction reactors into a highly metallized sponge iron product which is hot discharged. The reduction reactor has two zones an upper or reduction zone and a lower or discharge zone. The ore is charged to the top portion of the reduction reactor wherein it forms a bed which descends by gravity and is discharged by means of a suitable discharge valve. The reduction of iron ore mainly takes place while the ore flows downwardly in the reduction zone by means of a stream of hot reducing gas, largely composed of carbon monoxide and hydrogen. The reducing gas is fed to the reduction reactor at the bottom portion of the reduction zone and thereafter is divided into two streams, one upwardly flowing stream which performs the reduction counter-currently to the ores in the upper portion of the shaft furnace, and a downwardly flowing stream which flows co-currently with the bed and compensates for the heat lost during the passage of the bed through the lower or discharge zone wherein the bed is modified or carburized and thus maintaining the average bulk temperature of the product at a suitable high level. Such high levels range from 450 to 1100 degrees C., and more typically above 650 degrees for briquetting and in the 850 to 1000 degree C. range for metalurgical processing of the product (particularly 900 to 970 degrees C. for sponge iron product). Preferably the split flow is on the order of 90% upward and 10% downward. The downward flow can be modified as to flow rate, etc. so as to control carbonization of the sponge iron. Thereafter, hot particles are discharged from the bed and conveyed typically without further modification directly to electric arc furnaces or the like to be melted or be hot briquetted by means of a briquetting machine coupled to the reduction reactor.

In a broader aspect of the invention, the advantages of the split flow can be similarly achieved by feeding two separate flows of gas to the reactor in the region where the reduction zone and discharge zone meet, with the first such flow being reducing gas for upflow through the reduction zone and with the other such flow being a modified reducing gas, inert gas, natural gas, other carbonizing gas, or any other different hot gas appropriate for flowing through the discharge zone.

The present invention surprisingly can be used in maintaining the average bulk hot temperature of the particles discharged from the reactor while simultaneously cooling the outer particles in the discharge zone (to prevent sticking of hot sponge iron as taught by MacKay et al. U.S. Pat. No. 4,725,309 issued Feb. 16, 1988, the content of which is incorporated herein by reference). Even more surprising is the present inventors' combination of the present invention with the disclosure in the aforementioned U.S. Pat. No. 4,793,856 whereby a separate cooling co-current flow occurs along the walls of the reactor (but in the discharge zone, rather than in an intermediate zone) while simultaneously a hot co-current flow passes through the core of the discharge zone including bulk of the particles in such zone. This serves to prevent sticking, while maintaining the bulk average temperature.

BRIEF DESCRIPTION OF THE DRAWING

In this specification and the accompanying drawing we have shown and described preferred embodiments of our invention and have suggested various alternatives and modifications thereof; but it is to be understood that these are not intended to be exhaustive and that many changes and modifications can be made within the scope of the invention. The suggestions herein are selected and included for purposes of illustration in order that others skilled in the art will more fully understand the invention and principles thereof and will thus be enabled to modify it in a variety of forms, each as may be best suited to the conditions of a particular use.

The drawing diagrammatically illustrates apparatus capable of carrying out a preferred embodiment of the invention.

DETAILED DESCRIPTION OF THE INVENTION

Referring to the drawing, the numeral 10 designates a vertical shaft furnace having an upper reduction zone 12. Iron ore particles to be reduced enter to the top portion of the reactor 10 through feed pipes 14 wherein the descending bed of particles 15 are contacted with a counter-currently flowing stream 17 of hot reducing gas in the reduction zone 12 to convert said ore to sponge iron. The sponge iron product is hot discharged from the reduction reactor through a discharge pipe 16 and may be densified by means of a conventional briquetting machine 18 or may be conveyed to a remote location to be melted in an electric arc furnace, an induction furnace or other similar furnace used in the art.

The reducing gas can be produced by any known manner, for example in a catalytic reformer 20 by converting a mixture of steam entering through pipe 22, heat exchanger 24 and pipe 26 and natural gas passing through pipe 28, into a gas largely composed of carbon monoxide and hydrogen. Alternatively, the reduced gas can be produced within the reduction reactor 10 by the method disclosed in U.S. Pat. No. 4,528,030. The thus formed reducing gas is dewatered in heat exchanger 30 and conducted through pipes 32 and 34 to heater 36 and fed through inlet gas pipe 38 to the bottom portion of the reduction zone 12. A portion of natural gas may be diverted through pipe 40 and mixed thereafter with the reformed gas flowing in pipe 32. The incoming stream of reducing gas is divided into two portions 17 and 41. A first portion 17 flows upwardly counter-current to and reducing the descending bed of ore to metallic iron. The spent reducing gases leave the reduction reactor through exit pipe 42 and pipe 44 to cooling and dewatering quench cooler 46. A portion of the cooled and dewatered gases is conducted from pipe 48 and to vent pipe 50 to be used in another location or to be disposed of and the remaining major portion is fed as a recycled gas successively through a compressor 52, pipe 54, carbon dioxide removal unit 56, pipe 34, and on to heater 36 wherein the recycled gas is heated preferably to a temperature of 900° C. to 950° C.. The heated recycled gas is thence fed through pipe 38 to the bottom portion of the reduction zone 12.

A second portion 41 of the reducing gas flows downward co-currently to the bed of particles to provide the heat lost during the passage of the bed through the discharge zone 58 of the reactor. Since the reducing gas is upgraded prior to its introduction to the reduction reactor, certain controlled amounts of a hydrocarbon containing gas can be added (e.g. via pipe 40) as a portion of the make up. Therefore, the downwardly flowing reducing gas may modify or carburize the descending bed to a predetermined degree. Wall 60 is surrounded by a plurality of insulating heat-exchanging jackets (not shown) (as those disclosed in U.S. Pat. No. 4,725,309) adapted selectively to control or stop the amount of cooling fluid circulating therethrough so that the temperature of the wall 60 is maintained at desired levels for assuring a uniform and smooth flow of the bed of particles through this zone of the furnace.

As the bed of particles progresses downwardly to the bottom of the discharge zone the gas leaves the reactor through plenum 62 and thereafter through return pipe 64 to the dewatering and upgrading recycle loop and thence fed again through the inlet gas pipe 38.

A portion of the recycled gas may be diverted through pipe 66 to provide an upflow of cleaned and cooled gas to and through the discharge zone 58 (by closing valve 68) in case a cool discharge may be temporarily be needed or otherwise preferred (for example, during maintenance of the electric arc furnace, or other device to which the hot discharge is normally fed, it being difficult and potentially hazardous openly to store hot sponge iron).

From the foregoing description it should be apparent that the present invention provides an effective method and apparatus for producing sponge iron at a temperature suitable for melting or briquetting. The invention uses a portion of the same reducing gas which performs the direct reduction of the bed of iron ore to compensate for heat lost during the passage of the bed along the discharge zone of the reactor (minimizing in this way capital and operational costs by avoiding the need of extra equipment and the use of different gases to provide such heat). The product sponge iron has the same good characteristics of the product obtained by any other process with hot discharge.

As discussed earlier, in a broader aspect of the invention, the advantages of the split flow can be also achieved by feeding two separate flows of gas to the reactor in the region where the reduction zone 12 and discharge zone 58 meet, with the first such flow being reducing gas fed via pipe 38 for upflow 17 through the reduction zone 12 and with the other such flow fed via pipe 70 (shown in dotted lines) being a modified reducing gas, inert gas, natural gas, other carbonizing gas, or any other different hot gas appropriate for downflow 41 through the discharge zone 58.

Also shown is the surprising combination of the present invention with the disclosure in the aforementioned U.S. Pat. No. 4,793,856 whereby a separate cooling gas 1 is fed via pipe 72 (shown in dotted lines) in a co-current flow along the walls 60 of the reactor 10 (but originating from the discharge zone 58, rather than from an intermediate zone) while simultaneously a hot co-current flow 41 passes through the core of the discharge zone 58 including the bulk of the particles in such zone.

What is claimed is:

1. A method for the production of a hot discharged highly metallized sponge iron by the gaseous reduction of iron ores in a moving bed vertical reduction reactor having a reduction zone and a discharge zone by treatment with a reducing gas which process comprises the steps of:

charging the ore to the top of the reduction zone to form said moving bed, feeding to said reactor a hot reducing gas largely composed of carbon monoxide and hydrogen, flowing a first portion of the hot reducing gas upwardly through said reduction zone counter-currently to the bed of ore to convert the ore to sponge iron, removing said first portion of spent reducing gas from an upper portion of said reduction reactor, flowing a smaller second portion of the hot reducing gas downwardly through said discharge zone co-currently with the resulting bed of sponge iron at a rate sufficient to maintain the average bulk temperature of the bed at a suitable given elevated level, removing the spent second portion of reducing gas at the bottom of said discharge zone, and discharging the hot sponge iron product from said reactor.

2. A method according to claim 1, further comprising controlling the carburization of the bed of sponge iron by means of the second portion of hot reducing gas circulated.

3. A method according to claim 1, further comprising recycling to the feeding step said spent portion after dewatering, carbon dioxide removal, upgrading with make up gas, and reheating.

4. A method according to claim 1, further comprising cooling the particles immediately adjacent the outermost portion of the discharge zone while flowing the hot second portion through the core of said discharge zone.

5. A method according to claim 1, further comprising said sponge iron is discharged at a temperature in the range of 900 to 970 degrees centigrade.

6. A method according to claim 1, wherein the split flow of the hot reducing gas feed to the reactor is on the order of 90% to the first portion and 10% to the second portion.

7. A method for the production of a hot discharged highly metallized sponge iron by the gaseous reduction of iron ores in a moving bed vertical reduction reactor having a reduction zone and a discharge zone by treatment with a reducing gas which process comprises the steps of:

charging the ore to the top portion of the reduction zone to form said moving bed, feeding to said reactor a hot reducing gas largely composed of carbon monoxide and hydrogen, flowing a said hot reducing gas upwardly through said reduction zone counter-currently to the bed of ore to convert the ore to sponge iron, removing the spent reducing gas from an upper portion of said reduction reactor, flowing a separate hot sponge-iron compatible gas downwardly through said discharge zone co-currently with the resulting bed of sponge iron at a rate sufficient to maintain the average bulk temperature of the bed at a suitable given elevated level.

removing the spent compatible gas at the bottom of said discharge zone, and discharging the hot sponge iron product from said reactor.

8. Apparatus for the production of a hot discharged highly metallized sponge iron by the gaseous reduction of iron ores in a moving bed vertical reduction reactor having a reduction zone and a discharge zone by treatment with a reducing gas largely composed of carbon monoxide and hydrogen which comprises:

a vertical shaft furnace, an upper reduction zone adapted to accommodate a moving bed of said metal oxidic particles descending by gravity, a lower discharging zone, a discharge outlet, means for feeding a hot reducing gas at the bottom of said upper reduction zone, means for dividing said hot reducing gas in an upward first stream and a downward second stream, means for removing the spent first stream of hot reducing gas from the top of the reduction zone, and means for removing said second stream of hot reducing gas at the bottom of said discharging zone.

* * * * *

UNITED STATES PATENT AND TRADEMARK OFFICE
CERTIFICATE OF CORRECTION

PATENT NO. : 5,078,787

DATED : January 7, 1992

INVENTOR(S) : Becerra-Novoa, Jorge Octavio et al.

It is certified that error appears in the above-identified patent and that said Letters Patent is hereby corrected as shown below:

Column 7,
claim 7, line 15, delete the word "portion".

Signed and Sealed this

Thirtieth Day of March, 1993

Attest:

STEPHEN G. KUNIN

Attesting Officer

Acting Commissioner of Patents and Trademarks